(12) United States Patent
Lám et al.

(10) Patent No.: US 10,178,075 B2
(45) Date of Patent: *Jan. 8, 2019

(54) CLIENT-SIDE ENCRYPTION WITH DRM

(71) Applicant: Tresorit Kft, Budapest (HU)

(72) Inventors: István Lám, Budapest (HU); Szilveszter Szebeni, Budapest (HU); Tamás Koczka, Arlington, MA (US)

(73) Assignee: Tresorit, Kft, Budapest (HU)

( * ) Notice: Subject to any disclaimer, the term of this patent is extended or adjusted under 35 U.S.C. 154(b) by 0 days.

This patent is subject to a terminal disclaimer.

(21) Appl. No.: 14/846,954

(22) Filed: Sep. 7, 2015

(65) Prior Publication Data

US 2016/0182465 A1    Jun. 23, 2016

Related U.S. Application Data

(63) Continuation of application No. 14/576,724, filed on Dec. 19, 2014, now Pat. No. 9,129,095.

(51) Int. Cl.
| | |
|---|---|
| *H04L 9/08* | (2006.01) |
| *H04L 9/14* | (2006.01) |
| *G06F 21/62* | (2013.01) |
| *G06F 21/60* | (2013.01) |
| *H04L 29/06* | (2006.01) |
| *G06F 21/10* | (2013.01) |

(52) U.S. Cl.
CPC .......... *H04L 63/0442* (2013.01); *G06F 21/10* (2013.01); *G06F 21/6218* (2013.01); *H04L 63/0428* (2013.01); *H04L 63/061* (2013.01); *H04L 63/123* (2013.01); *G06F 21/60* (2013.01); *H04L 2463/101* (2013.01)

(58) Field of Classification Search
None
See application file for complete search history.

(56) References Cited

U.S. PATENT DOCUMENTS

| | | | | |
|---|---|---|---|---|
| 7,003,560 | B1* | 2/2006 | Mullen | G06Q 10/06 709/223 |
| 7,178,021 | B1* | 2/2007 | Hanna | G06F 21/6209 713/150 |
| 2006/0015580 | A1* | 1/2006 | Gabriel | H04N 7/17309 709/219 |
| 2014/0245001 | A1* | 8/2014 | Swaminathan | H04L 9/0637 713/160 |

OTHER PUBLICATIONS

International Search Report and Written Opinion, PCT/IB2015/002392, dated Apr. 28, 2016.

* cited by examiner

*Primary Examiner* — Alexander Lagor
(74) *Attorney, Agent, or Firm* — David H. Judson

(57) ABSTRACT

A technique for extending security to a data object (e.g., a document, a file, a message, etc.) once it has been shared and during collaboration with others who have access rights to that data object. The approach advantageously combines group key-based client-side encryption to secure the data object as it travels from a user's computer, to the cloud, and to a chosen collaborator's computer, together with a digital rights management (DRM) layer that provides permission management that associates a set of permission rights that travel with the data object.

21 Claims, 6 Drawing Sheets

CLIENT-SIDE ENCRYPTION WITH DRM

TECHNICAL FIELD

This application relates generally to secure, cloud-based collaboration and sharing of digital data objects, such as documents.

BRIEF DESCRIPTION OF THE RELATED ART

An increasing number of enterprises and private individuals choose cloud-based data storage solutions instead of building their own storage systems. Outsourcing storage has several advantages, including flexibility and cost efficiency. In addition, cloud-based data storage systems provide increased dependability and easy access to the data from anywhere and at any time. That said, cloud-based data storage systems also have disadvantages. Most importantly, data owners lose the control over their data, as a cloud operator can delete the data or even deny the execution of a requested delete operation. Furthermore, there are also serious security issues in such solutions, stemming from the fact that the cloud operators have access to the data of millions of people and thousands of companies. An attacker may break into the cloud system to obtain access to the data stored there, or the cloud operator itself may be tempted to misuse its privileged position. Thus, even the exploitation of a single vulnerability may lead to the compromise of a large amount of information.

In today's cloud-based data storage systems, access control to the stored data is based on the traditional access control list approach, where a trusted reference monitor enforces the access control policy represented by the access control lists. In cloud-based data storage systems, however, the reference monitor is under the control of the cloud operator, and hence, it cannot be trusted fully. Another approach is to use cryptographic protection mechanisms and, in particular, to store only encrypted data in the cloud. This, in turn, requires appropriate key management schemes to support abstractions, such as groups and shared resources.

Digital Rights Management (DRM) refers to technologies used for the protection of digital content, typically audio or audiovisual works. DRM works by encrypting the content before distribution, and by limiting access to only those end-users who have acquired a proper license to play or render (display) the content. An end-to-end DRM system typically comprises three (3) parts: encryption, business-logic and license-delivery. DRM starts with the encryption of the content. Once the content is encrypted, a key is required to unlock the content. The encrypted content can be delivered through any number of delivery methods. An end-user who desires to play or render the content visits an e-commerce web site and transacts with the business-logic process, usually involving one of registration, login, and/or payment; once this is done, the end-user is issued a license to play the content. The issued license typically comprises (i) a key (for decrypting the content), (ii) a set of rights (e.g. play or render exactly once, play for 30 days, render, or the like), and (iii) with the property that the license is valid only on the end-user machine to which it is issued. When an end-user attempts to play or render the DRM protected content, an end user player/client application enforces the DRM.

BRIEF SUMMARY

This disclosure describes a technique for extending security to a data object (e.g., a document, a file, a message, etc.) once it has been shared and during collaboration with others who have access rights to that data object. The approach advantageously combines group key-based client-side encryption to secure the data object as it travels (e.g., from a user's computer, to the cloud, and to a chosen collaborator's computer), together with a digital rights management (DRM) layer that provides permission management that associates a set of permission rights that travel with the data object.

In one embodiment, there are a group of users that desire to collaborate with one another by sharing digital data objects, such as documents, files, messages, and the like. Participants (members) of the group may change, and on a dynamic basis, as individual users leave or join the group. Each user of the group has a computing entity that has the group key-based client-side encryption capability. Each computing entity also is presumed to have access to a DRM solution that includes, for example, a rights management service and a DRM license server. Using the DRM solution, a user can associate a DRM license to a particular data object. Because individual users may be located in different locations (e.g., different offices), the data object themselves (in some protected form) are desired to be stored in a cloud storage so that the different collaborators can access the object when necessary. The secure document collaboration and sharing techniques of this disclosure are then managed "as-a-service," preferably by a service provider. The service provider operates a cloud-based management platform that provides several functions to facilitate the secure collaboration and sharing service. These functions include group key management, implementing access controls, and ensuring that access controls on the data objects being shared remain synchronized with the DRM solution, which is a separate and distinct system that is not under the service provider's control. The service provider's management platform also provides the users of the system with access to underlying cloud storage (e.g., Microsoft Azure, Amazon S3, or the like) in which the data objects themselves are ultimately stored.

In this embodiment, multiple end users subscribe to the secure collaboration and sharing service provided at a cloud-based management platform by a service provider. Each end user is assumed to have access to a DRM solution, which is distinct from the cloud-based management platform, and the cloud-based management platform interoperates or otherwise provides end users with access to underlying cloud-based storage. Each end user is provided a client-side encryption (CSE) module that is made available by the service provider. In this scenario, there is a user of a first computing entity that desires to share an object with the group. To that end, the user creates an encrypted DRM-protected object which, together with an access control, is then securely transferred over a secure transport channel (e.g., TLS/SSL) to the underlying cloud storage for storage there. The encrypted DRM-protected object preferably is generated at the first computing entity by applying a digital rights management (DRM) operation to the object to produce a DRM-protected object, and then (ii) using the CSE module, encrypting the DRM-protected object with a key. Preferably, the key used to encrypt the DRM-protected objected is a special type of key, referred to herein as a group key, which is managed by the service provider. The group key is generated at the first computing entity according to a distributed group key agreement protocol enforced by a set of computing entities that include the first computing entity but not the service provider. In addition to generating the encrypted DRM-protected object, and preferably via the cloud-based management platform, the user of the first computing entity also sets an access control on the encrypted DRM-protected object. The access control is distinct from the set of rights that are defined by and enforced by the DRM solution.

Both the DRM-protected object and its associated access control (as set) are provided to the cloud storage, preferably via a secure transport (e.g., TLS/SSL). The object and its access control then are store in the cloud storage in a folder that is "shared" among the group participants. When another member of the group (e.g., a user at a second computing entity) desires to access the object from this cloud storage-supported shared folder, the access control is then used to determine whether access to the encrypted DRM-protected object (and thus the object) by the second computing entity is permitted. If so, the encrypted DRM-protect object is transferred to the second computing entity, once again preferably over a TLS/SSL-secured transport channel. The object is then recoverable by the second computing entity using the group key to decrypt the encrypted DRM-protected object to generate the DRM-protected object, and then using a DRM operation to recover the object from the DRM-protected object.

The approach provides users in the group full distributed control over the object, even as the object is transported to and stored in the cloud, and even as membership in the group is changing. Because both the DRM license and group key must be used to recover the object, even a compromise of the DRM license server does not expose the object to scrutiny by anyone other than a current group member. Yet, the approach enables the DRM-based permission rights with respect to the object to travel with it, and to be enforced locally with respect to each particular user.

The foregoing has outlined some of the more pertinent features of the subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the subject matter and the advantages thereof, reference is now made to the following descriptions taken in conjunction with the accompanying drawings, in which.

DETAILED DESCRIPTION

Figure 1:
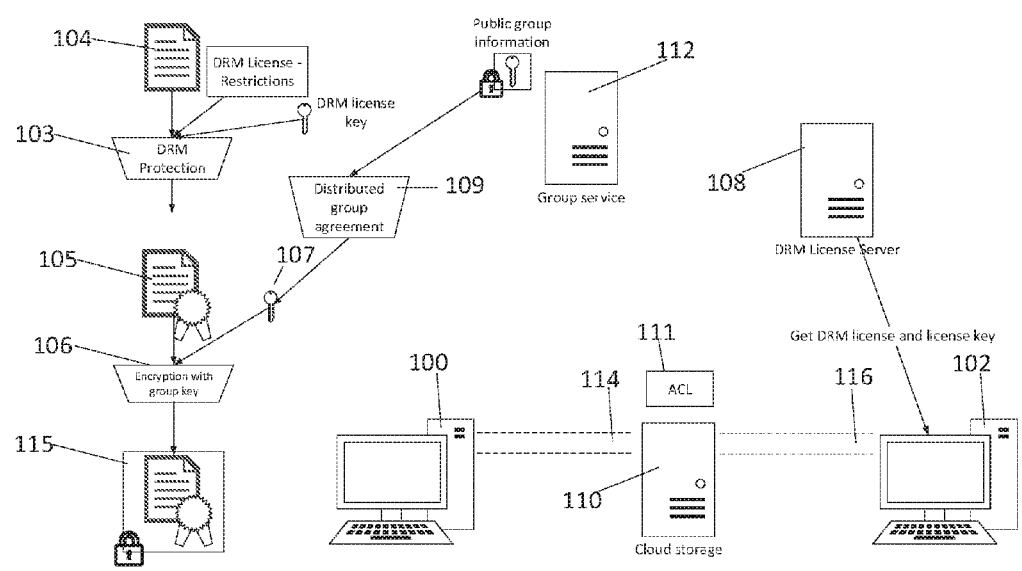
FIG. 1 depicts a high level architecture for document collaboration and sharing according to this disclosure.

The following is a glossary of relevant terms.

As used herein:

An "object" is any information that a user desires to protect using the described scheme. Typically, an object is one of: a document, a file comprising text, a message, an audio file, a video file, and an executable.

A "user" is an individual (or user "group") that handles an object. Thus, typically, a "user" is a person, an organization, a company, or some defined subset thereof.

A "group" is zero or more entities, and zero or more groups. Thus, a group may contain one or more other groups. Typically, a group has a list of participants. The entities in a group are the "participants," and the identity of the participants may change from time-to-time. Thus, a group may be static or dynamic.

A "computing entity" typically is a processor-implemented computer program, process, executable, execution thread, code or the like, together (as the context requires) with other system software, applications, utilities, and interfaces.

A "DRM-protected object" is an object that is protected with DRM. DRM is a set of access control technologies, with the aim to control what entities have access to a specific object.

A "DRM access type" is a different way in which an entity may use a DRM-protected object. Typically, such use includes one of: view (read a document), edit (edit a document), comment (editing only a subset of data in the object), print (print a document), play (listen to a song or watch a video), execute (run software on a machine), copy (copy a portion of a document), and the like.

A "DRM access table" is a list of entity and DRM access types. Typically, each DRM-protected object has a DRM access table associated therewith. This table may be a part of the file, but it may be located on a remote server.

A "DRM client" is software or an application (e.g., a media player, a Word processing program, a browser, a mobile app, etc.) that is able to output or otherwise render the actual content comprising an object, and at the same time enforces the digital "rights" as they are defined for DRM protected objects in line with the DRM access table in a "license." Typically, the DRM client, with the help of the DRM license server, only allows access for an entity to a DRM-protected object if the entity is allowed access according to the DRM access table associated with the object.

A "DRM license" is an object that contains a DRM content key for the entity, the DRM content key being provided by a DRM "license server" after checking the DRM access table. Typically, the DRM license contains one or more restrictions of use for the entity.

A "DRM license server" is a server that decides whether an entity can have access to an object. A DRM license server issues DRM content keys (the license) to consume the content. The server also may indicate the DRM access types the entity has for the object.

A "cloud" is a shared pool of configurable computing resources (e.g. networks, network bandwidth, servers, processing, memory, storage, applications, virtual machines, and services) that can be rapidly provisioned and released with minimal management effort or interaction with a provider of the service.

As noted above, users can form one or more groups, where each group has a shared "group key" (as defined in more detail below). The group key is used to protect shared resources of the group.

An "encrypted DRM-protected object" is a DRM-protected object that has been encrypted with a group key.

Secure Document Collaboration and Sharing

As noted above, this disclosure provides a technique for extending security to a data object (e.g., a document, a file, a message, etc.) once it has been shared and during collaboration with others who have access rights to that data object. The approach advantageously combines group key-based client-side encryption to secure the data object as it travels (e.g., from a user's computer, to the cloud, and to a chosen collaborator's computer), together with a digital rights management (DRM) layer that provides permission management that associates a set of permission rights that travel with the data object.

Generally, the techniques described herein are provided "as-a-service" by a service provider that operates a cloud-based management platform (or "group service") that provides several functions (described below) to facilitate the secure collaboration and sharing service. The group service provider publishes (or otherwise makes available to registered or subscribed users) one or more software modules to facilitate the service. One of these software modules is a client-side encryption (CSE) module that may be retrieved from the group service (e.g., from a web site or page) by a participating end user The CSE module may also be available natively in the end user's operating environment. An aspect of this service is that the service provider preferably is separate and distinct from any DRM solution or service from which DRM licenses are obtained and enforced. Thus, the service provider does not have access to the DRM license server itself. In addition, preferably the service provider also is distinct from the underlying cloud storage itself (provided by such services as Microsoft® Azure, Amazon® S3, private clouds, etc.), although this distinction (between the group service provider, on the one hand, and the cloud storage service provider, on the other hand), need not be exposed to the end user directly. In other words, the end users may store their protected documents in such third party cloud storage while accessing the group service through the service provider and its CSE and distributed group key management functions. As will be seen, the group service provider facilitates several high level functions, namely, group key management, implementing access controls, and ensuring that access controls on the data objects being shared remain synchronized with the separate DRM solution.

Although cloud-based implementation is preferred, the group service may be provided as a product, e.g., as an on-premises or enterprise-based solution.

FIG. 1 illustrates the basic environment in which the technique is implemented. In this example scenario, there a set of client computing entities that includes client 100 and client 102. The users of clients 100 and 102 are current members of a group of users that desire to collaborate with one another by sharing data objects, such as documents, files, messages, and the like. In this particular example, the user at client 100 has a document 104 that he or she desires to share with other members of the group including the user at client 102. Clients 100 and 102 each have access to a client-side encryption (CSE) module 106, and a DRM solution that includes a DRM license server 108. As noted above, the DRM license server typically is not provided by or necessarily associated with the group service; thus, from the perspective of the group service the DRM license server is not necessarily trusted.

The CSE module 106 provided by the group service typically is implemented in software executing in a processor, but the module also may be implemented in whole or in part as hardware, firmware, or some combination of the above.

As noted previously, the participants (members) of the group may change dynamically as individual users leave or join the group. Thus, the group may also other users and their associated computing entities (not shown). Using the DRM solution, a user can associate a DRM license to a particular data object, such as document 104. In one embodiment, the DRM solution is Microsoft® Rights Management Service (RMS), although the techniques herein are not limited to any particular DRM solution.

Because the individual users may be located in different locations (e.g., different offices), the document is desired to be stored in a cloud storage 110 so that the different collaborators can access and work on the document when necessary. As noted previously, the group service provider (and the group service management platform) typically also is distinct from the cloud storage 110. Thus, in this scenario, the operator of the cloud storage 110 also does not have access to the DRM license server 108, to the group service 112, or to the CSE module 106 used by the clients. Rather, and as will be described, the cloud storage 110 just provides raw data storage for the objects being protected and their associated access controls and DRM permissions.

To facilitate secure sharing and collaboration among group members, the user creates an encrypted DRM-protected object 115 which, together with an access control, is then securely transferred over a secure transport channel (e.g., TLS/SSL) 114 to the cloud storage 110 for storage there. The encrypted DRM-protected object 115 preferably is generated at the client 100 by applying a digital rights management (DRM) operation 103 to the document 104 to produce a DRM-protected object 105 (as indicated by the medallion), and then (ii) encrypting (by CSE 106) the DRM-protected object with a group key 107. The lock representation shown in the drawing represents the encryption applied to the DRM-protected object. Although not shown, the DRM-protected object also may be encrypted with the DRM license server public key prior to application of the group key. As will be described in more detail below, the group key 107 has been generated at the client 100 according to a distributed group key agreement protocol 109 enforced by a set of computing entities that include the client 100 (together with the client 102, and any other clients associated with current group members).

An important feature of this approach is that, while the group service (through the management platform 112) facilitates the distributed group operations, it does not itself have access in the clear to the group key 107 that enforces how the group members can interact with the protected documents. (Typically, the group key 107 is only stored at the group service in an encrypted format, and the group service does not possess the decryption key necessary to remove this encryption). Accordingly, because ultimately the group key (together with the DRM) protects the document, the group service does not have the ability to view or otherwise interact with the actual content.

In addition to generating the encrypted DRM-protected object, the user of the client 100 also sets an access control 111 on the encrypted DRM-protected object 115. The access control 111 is also provided to the cloud storage via the secure transport channel 114. The access control is distinct from the set of DRM permissions that are enforced by the DRM license managed by the DRM license server 108. Typically, the access control is more high level (e.g., a download permission, or some high level edit permission), wherein the DRM permissions (as will be described) can be and typically are much-more fine-grained.

The encrypted DRM-protected object 115 and its associated access control 111 received from the client 100 over the secure transport 114 are stored in the cloud storage 110. As will be described, preferably these objects are stored in a folder that is shared among the group members. This folder is sometimes referred to herein as a "shared folder" or "container." The contents of the folder are secured (from both the group service provider and the cloud service provider) by the combined group key/CSE and DRM techniques of this disclosure.

When the separate user at client 102 desires to access the document, he or she makes a request to the cloud storage 110. It is assumed here that the second user has registered/subscribed to the group service, and is otherwise qualified (e.g., via an authentication service) to use the service. If the second user is a current member of the group (as described in more detail below), he or she also has the group key itself. The access control 111, however, determines whether this particular end user should in fact be provided access to the object at this particular time. Thus, the access control may also enforce other restrictions, which may be group-based (e.g., provide a list of users, grant a read or write privilege to all members, etc.), temporal-based, location-based (e.g., source IP address, etc.), some combination thereof, or otherwise. An access control typically is implemented as an access control list (ACL), or by any other known mechanism. An access control may be encapsulated in some other artifact (e.g., a token). If the client 102 has access rights, the encrypted DRM-protected object is then transferred to the client 102, preferably over a secure transport channel 116.

The document 104 is then recoverable by the client 102 using the group key 107 (which, as noted above, the second user necessarily possesses as a current group member) to decrypt the encrypted DRM-protected object to generate (recover) the DRM-protected object. Once it recovers the DRM-protected object, the client 102 then performs a DRM operation to recover the actual document 104 from the DRM-protected object. Typically, this DRM operation involves an interaction with the DRM license server 108, as depicted. This completes the process.

Thus, the above-described and illustrated approach provides for group-based distributed access and rights management control that carries over to any computing device or user, because all files are encrypted individually. Even if there is a security leak or some part of the system is compromised, an attacker is unable to access the document due to the combined encryption layers of both the group key-based client-side encryption (CSE), on the one hand, and the DRM rights management solution, on the other (and further because the cloud storage provider does not have the group key or DRM license either). As will be described, the group key-based client-side encryption regulates security policies set by the content owner, while the DRM technology then enables local control (by permitted group members) over the data itself. If a user tries to share a document (e.g., via email or copying onto a thumb drive), the permission rights travel with the document so that no one can open the DRM-protected document without permission.

Stated another way, even if DRM license server 108, cloud storage 110 or group service 112 are hacked or otherwise compromised, the most such an attacker might accomplish is a denial-of-service (e.g., deleting the encrypted DRM-protected file). But, even then, no actual data (from that file) is leaked, even in the case of a full system compromise. Likewise, even if a current group member were to attack all of some of these servers, the most he or she could do would be to obtain a more expansive DRM license. Further, if a previous group member attacks the whole system, he or she may get access to some previous versions of the files, perhaps with a wider DRM license, but (even then) that attacker could not obtain the current file. This should be compared with current prior art approaches (typically, DRM and cloud storage), whereby during an attack all information may well be leaked.

The following provides additional details regarding the shared folder and the DRM protection aspects of the service. In a preferred approach, the group service (through client-side software or tooling) also provides the user with the capability of creating the shared folder that is the secure repository for both the encrypted DRM-protected object as well as its associated access control. The shared folder provides an "armored" cabinet (or, more specifically, a distributed group-key encrypted container) for a group of users with whom the user desires to share a particular document (and that group necessarily includes the user). The DRM permissions (sometimes referred to as "matching rights") are also stored in the folder (typically as a "list") by virtue of their being associated with the object during the initial DRM operation (step 103 in FIG. 1). The shared folder thus encapsulates for a group of users references one or more group documents, their associated access controls, and (necessarily) their matching rights lists.

Although the nature and scope of the DRM protection will depend on the implementation, typically it is "role-based." Thus, a matching rights list typically is a data set that defines privileges. With respect to a particular group of users, these privileges control, for example, who can view a file versus those who can print, edit, copy, or share it. In this manner, one or more defined roles are created for the group members. For example, one role is a "reader" that affords a person with that status the right to read a document but not to edit it. Another role might be an "editor" that affords a person with that status the right to both read and edit the document, but not to share it. Yet another role might be a "manager" that affords a person with that status all rights to view, edit and share. These rights are sometimes referred to "simple" rights, as compared to more "advanced" rights (e.g., print, copy-paste, print-screen, forward, delete a tresor, or the like) that may also be assigned. This delineation of simple versus advanced rights is merely exemplary, as the nature of these rights may vary by application. However designated, the matching rights list is a way to provide granular permissions and thus fine-level control for complex collaboration on sensitive documents. Once assigned, and as will be seen, preferably roles carry over to all of the user's devices to enable enforcement of the granular policies that are mapped to each defined role.

FIGS. 2-6 provide additional details regarding a preferred implementation of this approach. In this example scenario, there is a user 200, client software 202, group service 204, and the DRM license server 206. The client software 202 includes the client-side encryption (CSE) module, and one or more other software components that facilitate the group key, access control and other interactions with the group service 204. The group service 204 operates the cloud-accessible management platform that provides the high level functions of group key management (including maintaining the public keys of the group members, storing the encrypted group key, etc.), enabling the access control functionality, and synchronizing the access controls with the DRM license server. In this embodiment, the client software 202 (e.g., provided by the group service 204 operator) interoperates with a DRM solution (e.g., Microsoft RMS), for example, to automatically create a user account on the RMS servers, and to facilitate the creation of the user's own RMS public-private key pair and RMS certificate.

Figure 2:
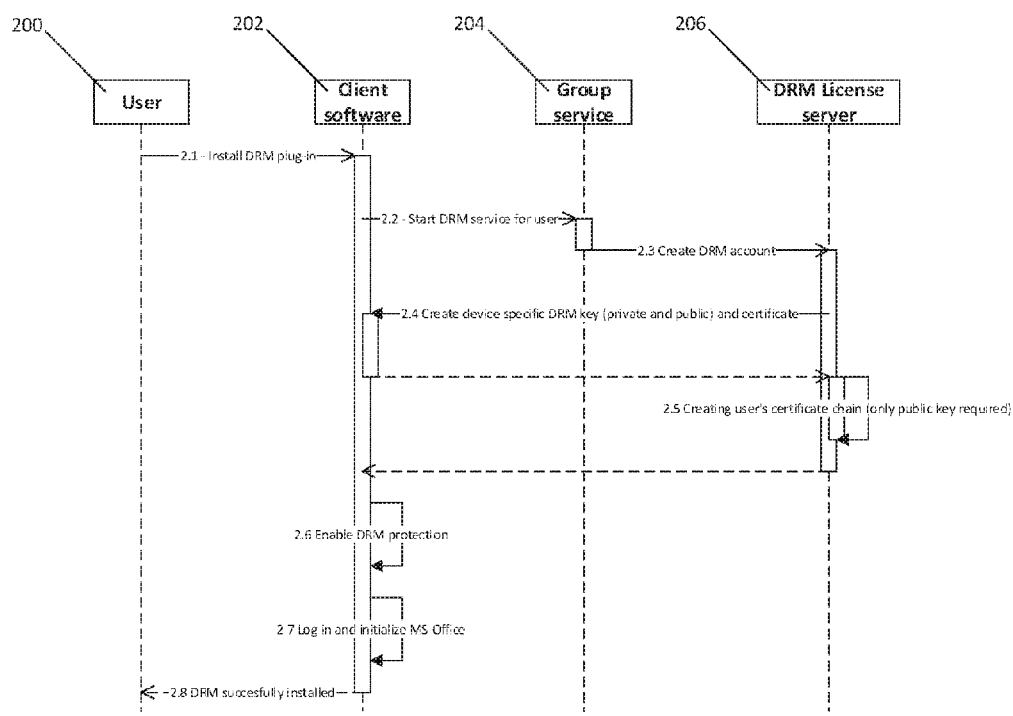
FIG. 2 depicts a process flow for downloading and installing a group service-supplied DRM plug-in for use by a client to facilitate the document collaboration and sharing service.

One of the additional software components (the client software 202) includes a DRM plug-in. FIG. 2 illustrates the basic operation to install the DRM plug-in at the client, to set up the client to use the CSE of the group service, and to establish the interactions among the various services. At step 2.1, the user installs the DRM plug-in. At step 2.2, the client software 202 starts the DRM service for the user. The group service 204 receives this request and issues a request at step 2.3 to create a DRM account at the DRM license server 206. The DRM license server 205 responds at step 2.4 by sending response to the client software 202 to create a device-specific DRM key (private and public) and certificate. The client software 202 then interacts with the DRM license server 206 at step 2.5 to create the user's certificate chain (with only the public key required). At step 2.6, the client software 202 enables DRM protection locally at the user client machine. Then, at step 2.7, the client software 202 logs-in and initializes an application (e.g., Microsoft® Office) that uses the document sharing and collaboration service. Any application may hook into the service in this manner, and the reference to Microsoft Office is merely exemplary. At step 2.8, the client software 202 issues a response to the user 200; the response indicates that the DRM plug-in was installed successfully and that the group service is now ready for use.

Figure 3:
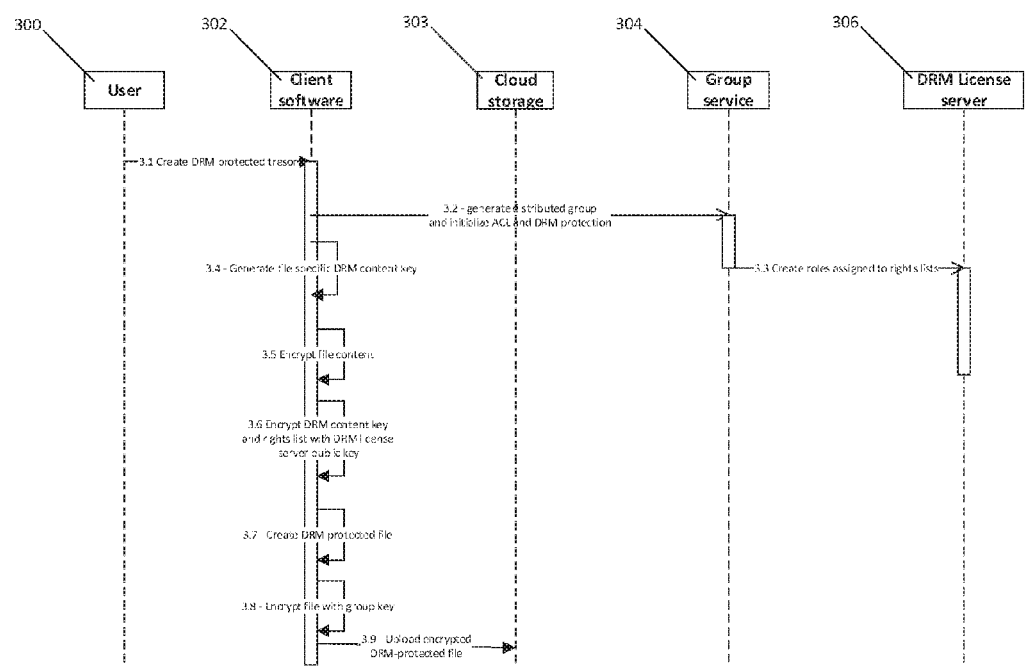
FIG. 3 depicts a process flow for creating a shared group folder in the cloud storage, as well as creating and storing therein an encrypted DRM-protected object.

FIG. 3 illustrates a process to create the shared folder in cloud storage, and to create and store the protected object. Here, there is the user 300, client software 302, group service 304, and DRM license server 306 as before (from FIG. 2). The figure also shows the cloud storage 303. The interaction preferably is as follows. At step 3.1, the user 300 issues a request (to the client software 302) to create a shared folder. In response, at step 3.2 the client software 302 interacts with the group service 304 to begin the process of generating the distributed group, and initializing the access control and DRM protection. (One or more of these operations may have been completed in a prior operation). As a result of step 3.2, the client software 302 obtains the group key. At step 3.3, the group service 304 issues a request to the DRM license server 306 to create one or more roles to be assigned to the matching rights list(s) for the group. At step 3.4, the client software 302 generates or obtains a file-specific DRM content key. At step 3.5, the client software 302 may encrypt file content. At step 3.6, the client software 302 encrypts the DRM content key and rights list with the DRM license server public key.

Thus, and as shown in FIG. 3, the content creator first encrypts the file content with a DRM license key (step 3.5), such as a random AES key. Then, (at step 3.6) the AES key, and all the associated licenses (e.g., Group A can read, Group B can read, write, print, etc.), are encrypted with the (e.g., RSA) public key of the DRM license server. The result is then attached to the file. In this way, if an unauthorized person opens the DRM protected file (e.g., while it is being forwarded), the person cannot see the content.

It is now assumed that the user 300 desires to use the client software 302 to protect an object. To that end, at step 3.7, the user instructs the client software 302 to create the DRM protected file. At step 3.8, the DRM-protected file is then encrypted with the group key. The encrypted DRM-protected file is uploaded to the cloud storage 303 and stored in association with the shared folder.

Figure 4:
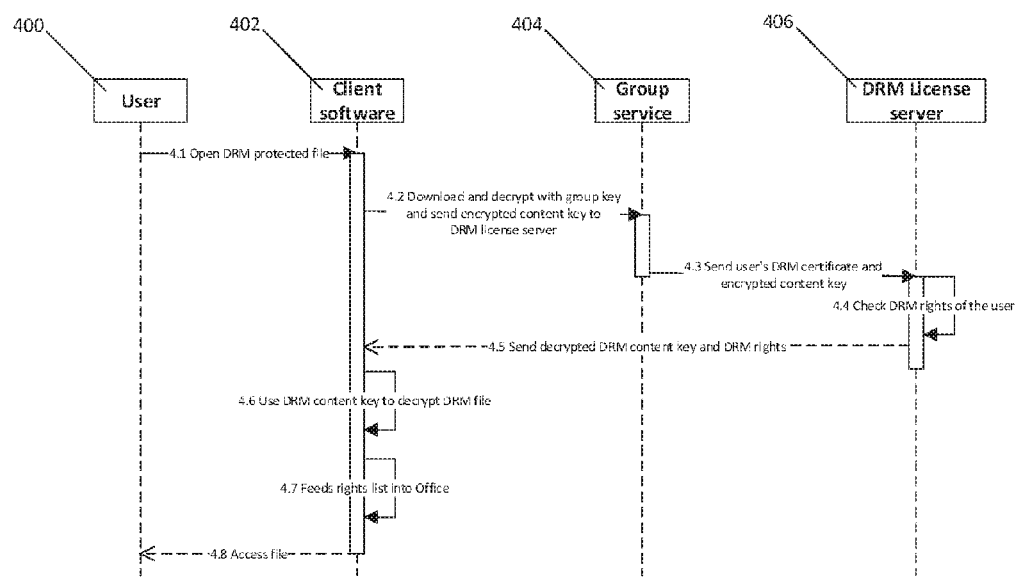
FIG. 4 depicts a process flow by which a second user of the group retrieves and accesses the protected content.

FIG. 4 illustrates how a second user in the group then accesses the protected file. Here, the user 400 includes client software 402 running on a separate computing entity from the first user's computing entity (shown in FIGS. 2-3). At step 4.1, the second user issues a request of its client software 402 to open a particular DRM-protected file. At step 4.2, the client software 402 downloads from the group service 404 the encrypted group key. During this step, the client software 402 decrypts the encrypted group key to recover the group key. The client software 402 also instructs the group service 404 to send the encrypted content key to the DRM license server 405. At step 4.3, the group service 404 forwards the user's DRM certificate and encrypted content key to the DRM license server 406. At step 4.4, the DRM license server 406 checks the DRM rights of the user. The DRM license server 406 then returns a response to the client software 402; this response includes the decrypted DRM content key and the DRM permission rights determined by the DRM license server. At step 4.6, the client software 402 uses the DRM content key to decrypt the DRM file. At step 4.7, the client software 402 feeds the DRM permission rights list to the application. Then, at step 4.8, the client software 402 enables access by the user to the requested file.

Figure 5:
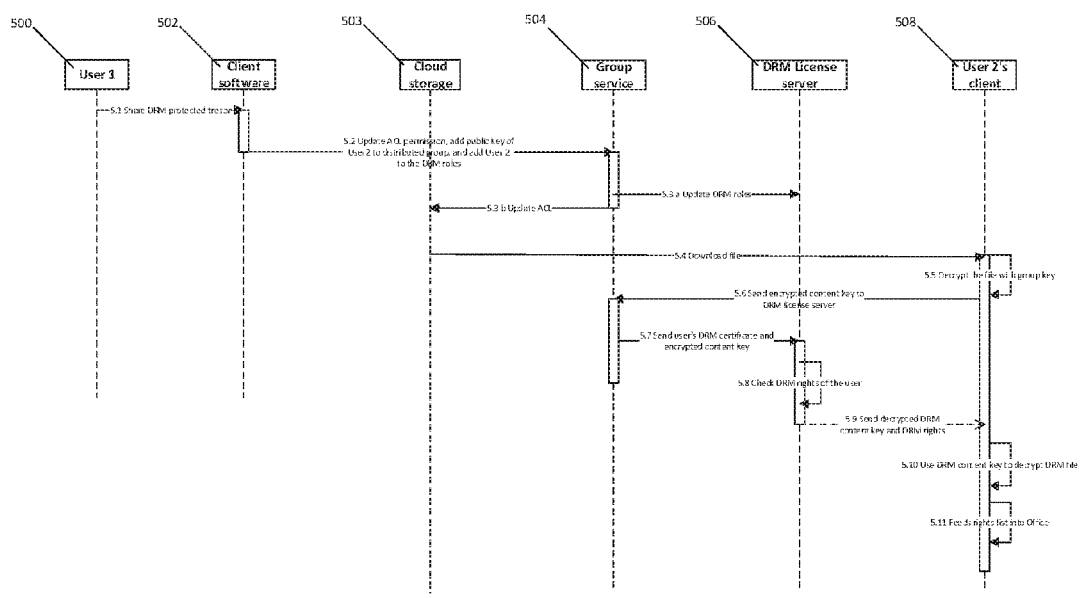
FIG. 5 depicts a process flow for sharing the shared folder with a new member of a group.
Figure 6:
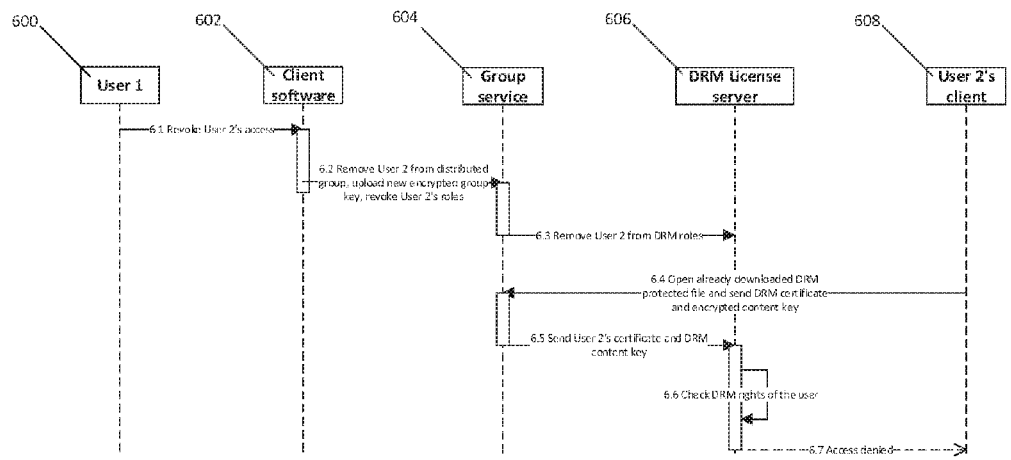
FIG. 6 depicts a process flow for revoking rights associated with a group member.

FIGS. 5-6 illustrate how the system enforces collaboration and sharing by and between current group members and, in particular, how a first user can invite a second user to the group (FIG. 5), and how the first user can revoke the user's user access to the group (FIG. 6).

As shown in FIG. 5, here there are two users 500 and 508, and user 500 has client software 502. The cloud storage 503, group service 504 and DRM license server 506 are also shown. In FIG. 6, these elements are also provided with the associated reference numerals for that figure.

At step 5.1, the user issues a request to the client software 502 to "share" the folder and its contents. At step 502, the client software 502 interacts with the group service 504 to update ACL permissions, add the group public key of the second user to the distributed group, and to add the second user to the DRM roles that have been established. At step 5.3a, the group service 504 updates the DRM roles with the DRM license server 506. At step 5.3b, the group service 504 updates the ACL (on the cloud storage 503) to reflect the new group member. At step 5.4, the second user has downloaded the file (as in FIG. 4). At step 5.5, the second user's client (which includes the client software, not shown here) decrypts the file with the group key. At step 5.6, the second user's client software sends a request to the group service 504 to send the encrypted content key to the DRM license server. The group service 504 responds at step 5.7 by sending the second user's DRM certificate and the encrypted content key. The DRM license server 506 once again checks the DRM rights of the second user at step 5.8. At step 5.9, the DRM license server 506 returns to the second user's client software the decrypted DRM content key and the DRM rights. At step 5.10, the second user client software then uses the DRM content key to decrypt the DRM file and, at step 5.11, feeds the rights to the application, as previously described.

FIG. 6 illustrates the revocation process, which occurs when a first user revokes a second user's access to the protected file. The routine begins at step 6.1 when the user 600 instructs its client software 602 to revoke the second user's access. At step 6.2, the client software 602 issues a request to the group service 604 to removes the second user from the distributed group, and to revoke the second user's roles. The client software 602 also generates and uploads to the group service 604 the new encrypted group key. At step 6.3, the group service 604 instructs the DRM license server 606 to remove the second user from the DRM roles. At step 6.4, the second user 608 (whose access rights have been revoked) tries to open the DRM protected file (which he or she has already downloaded in this example). To this end, the second user 608 client software sends the DRM license server 606 the DRM certificate and the encrypted content key. At step 6.5, the DRM license server 606 send the second user's certificate and DRM content key (now decrypted) to the group service 604. The group server 604 checks the DRM rights of the user at step 6.6. Here, because access has been revoked, at step 6.7, access is denied.

As the above examples illustrate, the approach advantageously provides several separate layers of protection that combine strict role definition, distributed control of data and encryption keys, and the ability to revoke access to files to ensure complete data security in the cloud and on user devices. As can be seen, the DRM layer controls permission management on a file level. The DRM plug-in and the associated group service provide control over the document together with a secure channel to handle sensitive files. Full end-to-end security uses client-side encryption to scramble files on the user's device before they are transferred to the cloud. As described and illustrated, preferably the transfer process itself (from client to the cloud, and from the cloud to another client) is protected within Transport Layer Security (TLS).

The techniques described herein in effect are zero knowledge-based in that neither the group service nor the DRM license server has access to the uploaded information; thus, the user data cannot be exposed. In this regard, the DRM license server does not have physical access to protected files at any stage of the process. Thus, and even with possession of the DRM content key, these servers cannot use it to decrypt data. Moreover, by applying the group service's client-side encryption to the DRM protected files, the content is encrypted before it is uploaded to the cloud. At this point, the combined permission of both the group service provider and the DRM license service is required to gain access, which preferably neither one party can grant to the other. The distributed group key management guarantees that no one but the group members can access the group encryption key. Finally, the group service does not have access to the content keys held by the DRM license server and, as a consequence, the group service provider cannot decrypt the content either. The resulting cloud collaboration service enabled by the group service provider keeps data safe while stored on the cloud and in transit to users. Authorized users, however, can collaborate on those documents, even as those users leave or join sharing groups. The group service makes secure and controlled collaboration possible. When cloud storage and the above-described sharing service are paired with the DRM, full end-to-end protection for data collaboration and security is enabled.

In the approach as described, the document to be protected is encrypted with a DRM key. That DRM key may be provided from a DRM key server (a typical scenario), or it may be provided in some other manner (e.g., the DRM key server's public key itself). Preferably, and as illustrated above, the DRM key is generated by the client, and the key is encrypted with the DRM license server's public key. This results in a DRM-protected document. Then, that DRM-protected document is encrypted again, this time with another key, to add a second layer of encryption. This second key is not shared with any key server. Rather, this second key is shared only with end user public keys, preferably using the distributed group key agreement method and file system described herein. Another user downloads the file, and decrypts it, preferably in reverse order. First, the second used decrypts the file using the key from the distributed group key agreement and encrypted file system method (which, together, comprise a client-side encryption), using the stored group information. This can be a persistent description. Then, the second user connects to the DRM key server, and gets the DRM key (possibly by sending the encrypted DRM key to the DRM license server). If access to the content has not been revoked, the second encryption layer is then decrypted, preferably in-memory, and preferably by the application (that uses the DRM), on-the-fly. The application then limits the user rights as outlined in the rights list (DRM license).

The DRM encryption enables on-line permission checking and fast revocation. Thus, and as depicted in FIG. 6, the owner of the content might notify the DRM license server (via the group service) that a specific user is no longer enabled to open up the document. Because the clients neither store the key nor the decrypted content, the specific user is no longer able to open the document. Only rightful users are able to decrypt the content, even if the servers (including any key server) are compromised.

As described, a preferred implementation approach combines client-side encryption (CSE), DRM, access controls (ACLs) on the server and transport layer encryption provides complete end-to-end security for user data. In the preferred embodiment as has been described, the client-side encryption wraps the DRM protection, which is applied to the document initially. The resulting encrypted DRM-protected document is then subject to transport layer (TLS) encryption. The following notation describes this preferred implementation: CSE (DRM (document)) via TLS. An alternative approach is to provide the DRM protection after CSE, namely: DRM (CSE (document)), although this approach is less desirable as it requires changes to the application to enable DRM to work appropriately.

Yet another alternative is integrated DRM and CSE, wherein the DRM protection happens with a public key for a local DRM server, which then acts as a non-transparent proxy; to decrypt the DRM protection a key (which is encrypted with an online license server) is encapsulated into an encrypted container that is shared between the cryptography group members. This latter approach has certain advantages, namely, ease of integration, easier access synchronization, and providing the client-side encryption as part of the DRM protection itself. For the DRM application it is transparent. In this integrated approach, the content key of a file is cryptographically derived from (1) a DRM key obtained from a DRM license server, and (2) the private key of a group that implements the integrated DRM and CSE solution.

Client-Side Encryption using a Group Key Protocol

By way of additional background, the following section provides details regarding a preferred group key protocol that is used herein.

As noted, the shared resources of a group may be modeled as an online file-system. This is the shared folder for the group, as described above. The content of the shared folder should be only accessible by the participants (i.e., the members) of the group. For example, consider the following example: Alice, Bob and Carol are colleagues, and they form a group. This group has a shared folder, which can be accessed only by Alice, Bob and Carol. In this shared folder, the individuals share various objects, such as company-related documents, spreadsheets, presentations, etc. Physically, and as described, this shared folder is stored on a cloud storage run by the cloud operator (e.g., Microsoft Azure, Amazon S3, etc.).

A non-member may have or desire to obtain access to content of the shared folder. For example, the cloud "operator" typically has access to encrypted shared folders and channels between and among the clients who participate in a group. From a security point-of-view, one can assume that the operator is honest, but curious, which means that it does not intentionally mount denial-of-service type attacks (e.g. deleting a shared folder, preventing communications, etc.), but one might also assume that the operator may still want to access the content of the shared folder. Another type of individual who may desire access is a "previous group member," which as its name implies is a person who was a group member but who is now removed from the group; a previous group member is presumed to have had access to one or more (or a series) of previous group keys and to the previous states of the shared folder. An "outsider" is one who does not have direct access to the shared folder, but has access to communication channels, in particular has access to the channels used for upload or download of files to/from the cloud.

Thus, in the typical scenario, group membership changes from time-to-time: user(s) leave the group and other user(s) can join the group. These operations require that the permissions to the shared folder must be changed, such that only the members of changed group can have access to it. A join or leave operation is coordinated by a sponsor, who can be an arbitrary member of the group. Any group member can calculate the actual shared group key using the group's public information and the member's own private key. Any group member can refresh its public key in the group, replacing its old key with a new one. Also, any group member can initiate a proactive refreshing of the group key by time to time, without changing actually any public key in the group.

Continuing with the above example, one day Carol is fired from the company, therefore she has to be removed from the group. The remove operation (leave) is done by the sponsor, say Alice. Because Carol's seat cannot be left empty, the management decides to employ Daniel. As Daniel has to access all the business files that were accessible by Carol, Daniel must join the group. For this reason an arbitrary member of the group, say Bob, invites Daniel. This means Bob will act as the sponsor in that join operation.

After each step leave procedure, the shared secret group key must change; otherwise, the previous group member may have access to the shared, encrypted data. This property is called forward secrecy. The join operation may indicate the change of the group key, as some applications (e.g., live streaming) require backward secrecy. If the data is persisted and stored in a shared space, however, it is desired that new users should be able to access the data stored before they have joined to the new group. The system thus preferably supports calculate of the previous versions of the group keys.

Any member should validate the group key before using it. Assume, for example, that Malory, an attacker, is an operator or a previous group member, and (as such) has access to the public information stored about the group (e.g. list of the member public keys); accordingly, Malory may overwrite the group by adding herself to the group, and generating a new secret key, known by her. In that case, Malory does not get access to content for previously stored information. If, however, the attached encrypted file system uses some kind of lazy-re-encryption or key refreshment for the latest key, other members may re-encrypt the data using the key injected by Malory. To prevent such secret key-injection attack, preferably any group member, before using a new group key for re-encryption, must validate that the one who created or had access to that key also had access to the previous group key used for the data to be re-encrypted.

One possible approach to distributed key management involves the RSA (Rivest-Shamir-Adelman) algorithm. In this approach, each user has to generate keys its system, as follows. First, generate RSA private and public key on its client; second, create a Certificate Signature Request (CSR), including the public key generated in the previous step. Third, send the CSR to the server. The server signs the CSR, if that meets with the requirements, and issue two certificates: one including all data of the user, and one anonym certificate, which includes only the hash of the other certificate and the email address of the user. For joining, a sponsor runs the following steps. First, the sponsor downloads an anonym certificate from the server, using the e-mail address of the invited user. Anonym certificates help protect the privacy of the users: the sponsor will not gain more private information about the user more than what is already known for him/her. Then, the sponsor downloads the latest shared group file from an untrusted server. The sponsor checks the HMAC of the file and a linked list of the previous group keys, preferably with each key encrypted with a newer key: $E_{k\_j}(K\_i-1)$. The sponsor then continues by generating a new group key. The sponsor then appends the linked list with the previous group key, encrypted with the new group key. Thereafter, the sponsor generates a key encryption key for each group member, and encrypts the new group key with the freshly generated, different key encryption keys, including the invited, new user. The sponsor might not need to use key encryption keys, but rather may just encrypt the group key with the public keys depending on the key agreement algorithm. Thus, for example, RSA without OAEP requires key encryption keys, e.g., to permit a remainder-based attack. The sponsor then encrypts the key encryption keys for each user using the users' public keys, including the new user. The sponsor then stores all this in one file, and HMACs the content of the file with a key derived from the new group key; the sponsor may also sign the result with its public key.

Each group member can validate the published group key before re-encryption of old content by checking that the key used for the old content is in the linked list starting with the newest group key. The linked list proves that, in each step, the sponsor knew the previous group key, so the sponsor did not inject a secret key. The HMAC on the whole file prevents a public key injection attack; if the group key is unknown for the attacker, the attacker cannot inject a public key.

The leave and refresh procedures are quite similar, the only difference being that, during the leave procedure, the sponsor removes a public key and, during the refresh procedure, the sponsor replaces its own public key for a newer one.

Instead of RSA, a Diffie-Hellman-based or other group key agreement can be used for sharing each group secret.

Each above-described process preferably is implemented in computer software as a set of program instructions executable in one or more processors, as a special-purpose machine.

Representative machines on which the subject matter herein is provided may be Intel Pentium-based computers running a Linux or Linux-variant operating system and one or more applications to carry out the described functionality. One or more of the processes described above are implemented as computer programs, namely, as a set of computer instructions, for performing the functionality described.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the disclosed subject matter has been described in the context of a method or process, the subject matter also relates to apparatus for performing the operations herein. This apparatus may be a particular machine that is specially constructed for the required purposes, or it may comprise a computer otherwise selectively activated or reconfigured by a computer program stored in the computer. Such a computer program may be stored in a computer readable storage medium, such as, but is not limited to, any type of disk including an optical disk, a CD-ROM, and a magnetic-optical disk, a read-only memory (ROM), a random access memory (RAM), a magnetic or optical card, or any type of media suitable for storing electronic instructions, and each coupled to a computer system bus. The functionality may be built into the name server code, or it may be executed as an adjunct to that code. A machine implementing the techniques herein comprises a processor, computer memory holding instructions that are executed by the processor to perform the above-described methods.

While given components of the system have been described separately, one of ordinary skill will appreciate that some of the functions may be combined or shared in given instructions, program sequences, code portions, and the like.

Preferably, the functionality is implemented in an application layer solution, although this is not a limitation, as portions of the identified functions may be built into an operating system or the like.

The functionality may be implemented with any application layer protocols, or any other protocol having similar operating characteristics.

There is no limitation on the type of computing entity that may implement the client-side or server-side of the connection. Any computing entity (system, machine, device, program, process, utility, or the like) may act as the client or the server.

While given components of the system have been described separately, one of ordinary skill will appreciate that some of the functions may be combined or shared in given instructions, program sequences, code portions, and the like. Any application or functionality described herein may be implemented as native code, by providing hooks into another application, by facilitating use of the mechanism as a plug-in, by linking to the mechanism, and the like.

More generally, the techniques described herein are provided using a set of one or more computing-related entities (systems, machines, processes, programs, libraries, functions, or the like) that together facilitate or provide the described functionality described above. In a typical implementation, a representative machine on which the software executes comprises commodity hardware, an operating system, an application runtime environment, and a set of applications or processes and associated data, that provide the functionality of a given system or subsystem. As described, the functionality may be implemented in a standalone machine, or across a distributed set of machines.

The platform functionality may be co-located or various parts/components may be separately and run as distinct functions, in one or more locations (over a distributed network).

Available services models that may be leveraged in whole or in part include: Software as a Service (SaaS) (the provider's applications running on cloud infrastructure); Platform as a service (PaaS) (the customer deploys applications that may be created using provider tools onto the cloud infrastructure); Infrastructure as a Service (IaaS) (customer provisions its own processing, storage, networks and other computing resources and can deploy and run operating systems and applications). A cloud platform may comprise co-located hardware and software resources, or resources that are physically, logically, virtually and/or geographically distinct. Communication networks used to communicate to and from the platform services may be packet-based, non-packet based, and secure or non-secure, or some combination thereof. A representative cloud platform comprises host machines (e.g., servers or like physical machine computing devices) connected to a physical datacenter network, typically via a hypervisor management VLAN. The environment typically also includes load balancers, network data switches (e.g., top-of-rack switches), firewalls, and the like. Physical servers in the environment are each adapted to dynamically provide one or more virtual machines (VMs) using virtualization technology, such as VMWare. Multiple VMs can be placed into a single host machine and share the host machine's CPU, memory and other resources. Typically, a cloud is maintained by a "cloud operator" or "operator."

The techniques herein provide for improvements to another technology or technical field, namely, cloud computing, access control systems, digital rights management systems, and document collaboration systems, as well as improvements to the functioning of group-based encryption tools and methods, all as described herein.

Having described our invention, what we now claim is as follows.

The invention claimed is:

1. Apparatus, comprising:
one or more hardware processors;
computer memory storing computer program instructions executed by the hardware processors:
to receive and store an encrypted DRM-protected object, the encrypted DRM-protected object having been generated at a first computing entity by (i) applying a digital rights management (DRM) operation to an object to produce a DRM-protected object, the DRM-protected object being produced at least in part by applying a given function to an object using a DRM key, and encrypting at least the DRM key using a key associated with a DRM license server, and (ii) encrypting the DRM-protected object with a group key, the group key having been generated at the first computing entity according to a distributed group key agreement protocol enforced by a set of computing entities that include the first computing entity but not the apparatus, wherein the set of computing entities that enforce the distributed group key agreement protocol changes from time-to-time by one of: a computing entity joining the set, and a computing entity leaving the set;
to receive and store an access control that is set on the encrypted DRM-protected object;

to use the access control, in response to receipt of a request from a second computing entity that is a member of the set of computing entities, to determine whether access to the encrypted DRM-protected object and thus the object by the second computing entity is permitted; and to provide the encrypted DRM-protected object to the second computing entity when access to the encrypted DRM-protected object and the object by the second computing entity is permitted as determined by the access control, the object being recoverable by the second computing entity using the group key to decrypt the encrypted DRM-protected object, and a DRM operation with the DRM license server to recover the object.

2. The apparatus as described in claim 1 wherein the encrypted DRM-protected object and the access control are received from the first computing entity over a secure transport channel.

3. The apparatus as described in claim 1 wherein the encrypted DRM-protected object is provided to the second computing entity over a secure transport channel.

4. The apparatus as described in claim 1 wherein the group key is an encryption key that is shared by current members of the set of computing entities.

5. The apparatus as described in claim 4 wherein the encryption key is protected by public keys associated with the current members of the set of computing entities.

6. The apparatus as described in claim 1 wherein the computer program instructions are executed in the hardware processors as software-as-a-service.

7. The apparatus as described in claim 1 wherein the computer program instructions are further operative to authenticate a user associated with the second computing entity.

8. The apparatus as described in claim 1 wherein the DRM operation also includes encrypting a DRM license using the key associated with the DRM license server.

9. The apparatus as described in claim 1 wherein the set of computing entities is dynamic.

10. The apparatus as described in claim 1 wherein the object is one of: a document, a file comprising text, a message, an audio file, a video file, and an executable.

11. The apparatus as described in claim 1 wherein the access control is a role-based access control.

12. The apparatus as described in claim 1 wherein the DRM operation is implemented using a third party DRM protection technology.

13. Apparatus operative as a client device, comprising:
at least one hardware processors;
computer memory storing computer program instructions executed by the hardware processor:
 to apply a digital rights management (DRM) operation to an object to produce a DRM-protected object, the DRM-protected object produced by applying a given function to the object using a DRM key, and encrypting at least the DRM key using a key associated with a DRM license server;
 to encrypt the DRM-protected object with a group key to produce an encrypted DRM-protected object, the group key having been generated at the client device and according to a distributed group key agreement protocol enforced by a set of computing entities that include the first computing entity, wherein the set of computing entities that enforce the distributed group key agreement protocol changes from time-to-time by one of: a computing entity joining the set, and a computing entity leaving the set;
 to establish an access control on the encrypted DRM-protected object; and
 to output the encrypted DRM-protected object and the access control to a cloud storage, the encrypted DRM-protected object and the access control configured to be stored in a shared folder at the cloud storage and selectively released to one or more other computing entities that are members of the set of computing entities based on the access control, the object being recoverable by the other computing entity using the group key to decrypt the encrypted DRM-protected object, and a DRM operation with the DRM license server to recover the object.

14. The apparatus as described in claim 13 wherein the computer program instructions are further operative to output the encrypted DRM-protected object and the access control to a trusted key server over a secure transport channel.

15. A method of protecting an object, comprising:
receiving and storing information, the information having been generated at a first computing entity using a digital rights management (DRM) operation and a group key, the group key having been generated at the first computing entity according to a distributed group key agreement protocol enforced by a set of computing entities that include the first computing entity, wherein the set of computing entities that enforce the distributed group key agreement protocol changes from time-to-time by one of: a computing entity joining the set, and a computing entity leaving the set, the information having been generated by applying a given function to the object using a DRM key, and encrypting at least the DRM key using a key associated with a DRM license server;
receiving and storing an access control that is set on the information;
in response to a request from a second computing entity that is a member of the set of computing entities, using the access control to determine whether access to the information by the second computing entity is permitted; and
when access to the information by the second computing entity is permitted as determined by the access control, providing the information to the second computing entity, the object being recoverable by the second computing entity using the group key and a DRM operation with the DRM license server.

16. The method as described in claim 15 wherein the information is an encrypted DRM-protected object.

17. The method as described in claim 16 wherein the object is recoverable by the second entity using the group key to decrypt the encrypted DRM-protected object to produce a DRM-protected object, and then applying the DRM key to the DRM-protected object to recover the object.

18. The method as described in claim 15 wherein the access control is a role-based access control.

19. The method as described in claim 15 wherein the object is one of: a document, a file comprising text, a message, an audio file, a video file, and an executable.

20. The method as described in claim 15 wherein the group key is an encryption key that is shared by current members of the set of computing entities.

21. The method as described in claim 20 wherein the DRM key is shared with the encryption key.

* * * * *